United States Patent
Hong et al.

(10) Patent No.: US 7,050,269 B2
(45) Date of Patent: May 23, 2006

(54) ASSEMBLY FOR FACILITATING LATCH INSTALLATION

(75) Inventors: Yiren Hong, Singapore (SG); TakKoon Ooi, Singapore (SG); ChorShan Cheng, Singapore (SG); Mo Xu, Singapore (SG); YongJie Tang, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 552 days.

(21) Appl. No.: 10/460,489

(22) Filed: Jun. 12, 2003

(65) Prior Publication Data

US 2004/0027726 A1 Feb. 12, 2004

Related U.S. Application Data

(60) Provisional application No. 60/402,845, filed on Aug. 12, 2002.

(51) Int. Cl.
*G11B 5/54* (2006.01)
(52) U.S. Cl. ..................................... 360/256
(58) Field of Classification Search ................ 360/256, 360/256.2, 256.3, 256.5, 256.6
See application file for complete search history.

(56) References Cited

U.S. PATENT DOCUMENTS

| | | | |
|---|---|---|---|
| 4,647,997 A | 3/1987 | Westwood | |
| 5,305,170 A | 4/1994 | Dion | |
| 5,636,090 A | 6/1997 | Boigenzahn et al. | |
| 5,663,855 A * | 9/1997 | Kim et al. | 360/256.2 |
| 5,729,405 A * | 3/1998 | Isomura et al. | 360/256.2 |
| 5,734,527 A * | 3/1998 | Reinhart | 360/256.2 |
| 5,999,370 A | 12/1999 | Stone et al. | |
| 6,115,222 A * | 9/2000 | Andrews et al. | 360/265.1 |
| 6,381,103 B1 * | 4/2002 | Misso et al. | 360/256.2 |
| 6,717,775 B1 * | 4/2004 | Ong et al. | 360/256.2 |

* cited by examiner

*Primary Examiner*—Angel Castro
(74) *Attorney, Agent, or Firm*—Derek J. Berger

(57) ABSTRACT

A voice coil motor pole assembly for supporting a latch is disclosed. The pole assembly includes a pin serving as an axle for the latch. The pole assembly also includes a protrusion that extends over a portion of the latch when the latch is mounted on the pin to thereby prevent the latch from being dislodged from the pin.

20 Claims, 5 Drawing Sheets

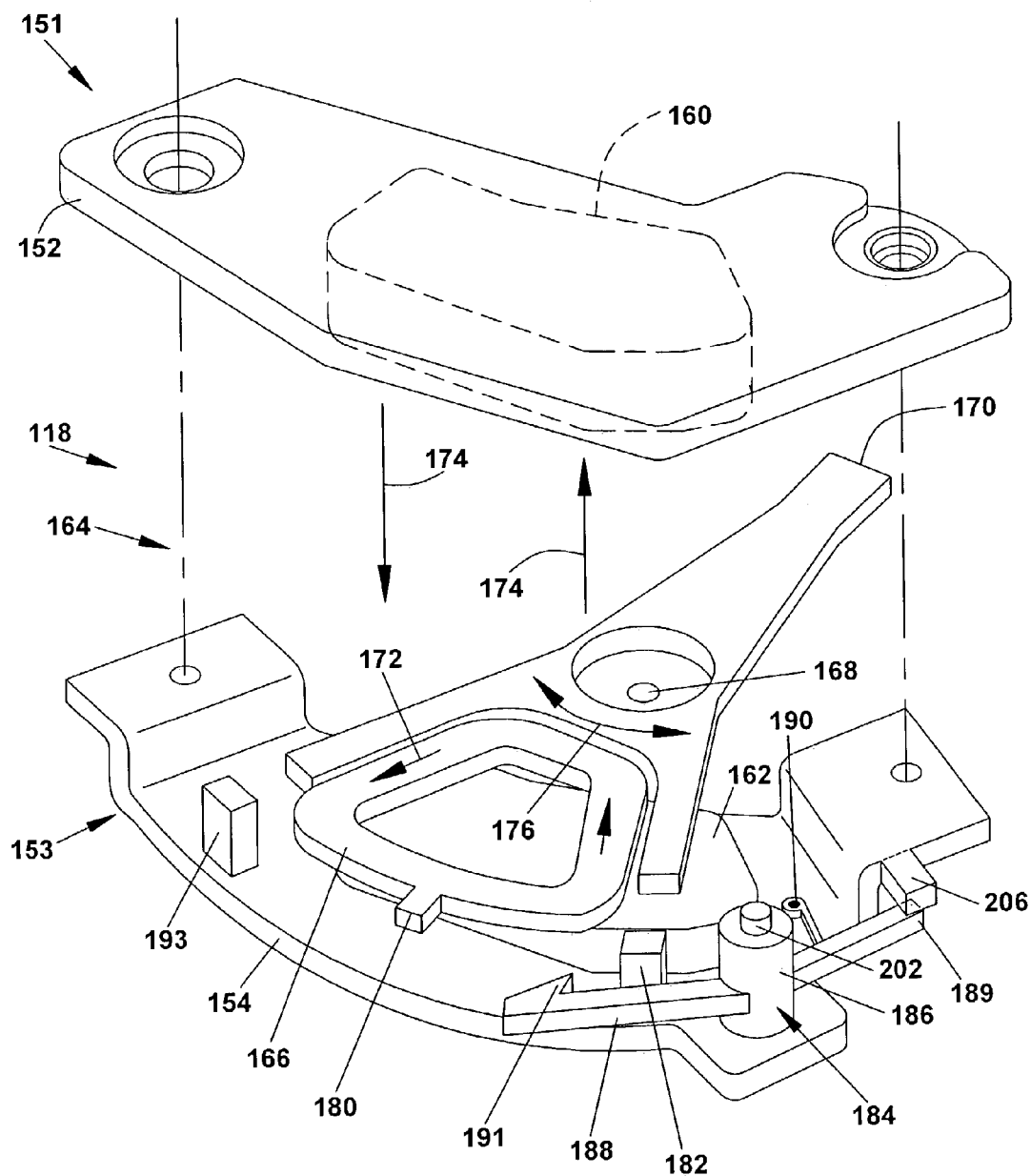

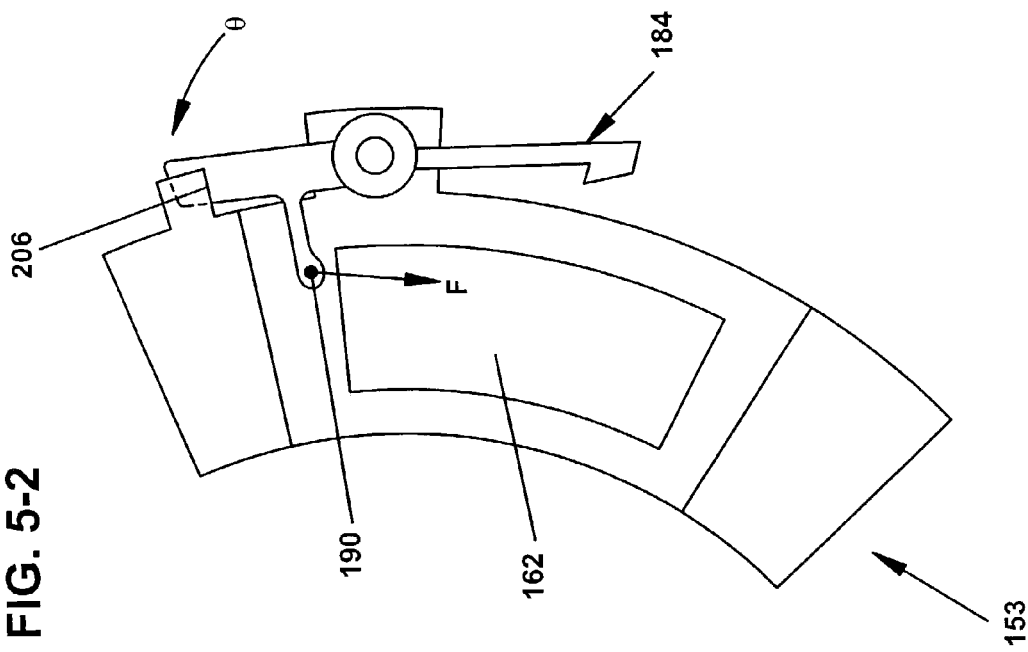
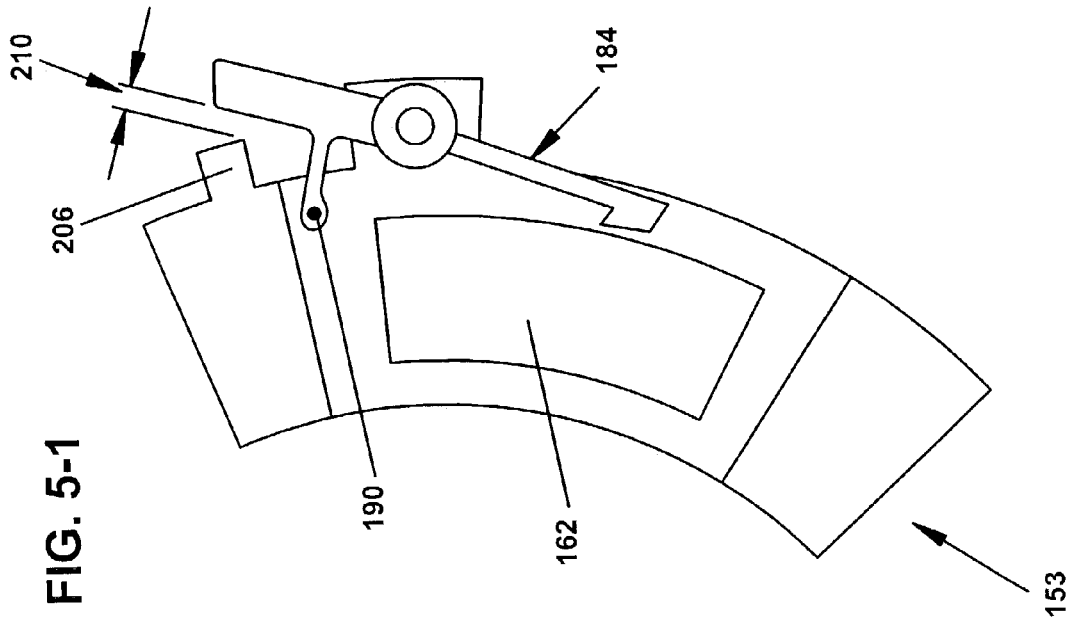

ASSEMBLY FOR FACILITATING LATCH INSTALLATION

CROSS-REFERENCE TO RELATED APPLICATION

This application claims priority from U.S. Provisional Application 60/402,845 filed on Aug. 12, 2002 for inventors YiRen Hong, Tak Koon Ooi, ChorShan Cheng, Mo Xu and Yongjie Tang and entitled "INERTIA LATCH PIVOT, IMPROVED DESIGN FOR SIMPLIFIED INSTALLATION AND COST REDUCTION."

FIELD OF THE INVENTION

The present invention relates generally to the field of data storage devices, and more particularly but not by limitation to an assembly for supporting a latch for a data storage system.

BACKGROUND OF THE INVENTION

In some devices such as disc drives, a voice coil motor (VCM) is used to position at least one transducer head over a desired radial position on at least one disc that stores information. A VCM may include a first plate, and may include a second plate spaced from the first plate. A permanent magnet is joined to the first plates to form an air gap. Where two plates are provided, the upper plate and any attached permanent magnets is referred to as a top pole assembly and the lower plate and any attached magnets is referred to as a bottom pole assembly. A voice coil is positioned in the air gap and is rotationally mounted to an axle. Each transducer head is mounted on an arm which forms part of an actuator that is coupled to the voice coil. When electric current is passed through the voice coil, the current interacts with the magnetic field in the air gap. This causes movement of the voice coil, which in turn effects rotation of the actuator.

When the disc drive is energized and the disc is spinning, the voice coil motor positions the head over data stored on the spinning disc. The spinning generates an air bearing separating the head from the spinning disc. When the disc drive is de-energized and the disc stops spinning, there is no air bearing and the head contacts the smooth stationary disc. If the sticking friction ("stiction") between the head and the disc is too great, the spindle motor may be incapable of rotating the disc when the disc drive is restarted. A common method of avoiding this problem is to move the head with the voice coil motor to a "park" portion of the disc when the disc drive is de-energized. The park portion of the disc is textured so that it will not stick to the head, and no data is stored on the park portion. Various kinds of latches may be used to latch the actuator in this park position when the disc drive is de-energized. To ensure that the actuator remains in the park position even when the disc drive experiences a high level of shock, in addition to a primary latch, a secondary or inertial latch may also be employed. Inertial latches move in response to high level external shocks to lock the actuator in place and thereafter disengage when the shock level decreases. Under lower levels of shock, which are insufficient to move the inertial latch, the actuator is held in place only by the primary latch.

One problem faced by drive manufacturers is the cost incurred by additional parts and assembly steps required to install these latches. For example, one installation method involves mounting the inertial latch to one of the top and bottom pole assemblies of the VCM prior to disc drive assembly. In this instance, the combined inertial latch and single (top/bottom) pole are transported from a supplier to the disc drive manufacturing plant and/or along an assembly line during manufacture of the disc drive before the top and bottom poles of the VCM are joined together. Thus, the inertial latch needs to be constrained on the single (top/bottom) pole during transportation. One current technique to constrain the inertial latch on the top/bottom pole involves the use of a pivot pin with a cap. The pivot pin passes through a first groove in a hub of the inertial latch and fits into a second groove in the top/bottom pole of the VCM. The cap of the pivot pin constrains the inertial latch on the top/bottom pole of the VCM. One of the disadvantages of this technique is that pivot pins with caps are costly. Further, the inertial latch has to be first mounted on the pin and then the pin with the mounted inertial latch has to be press-fit into the upper/lower plate of the VCM. This is a multi-step operation which is relatively time consuming.

Embodiments of the present invention provide solutions to these and other problems, and offer other advantages over the prior art.

SUMMARY OF THE INVENTION

A voice coil motor pole assembly for supporting an inertial latch is disclosed. The pole assembly includes a straight pin serving as an axle for the inertial latch. The pole assembly also includes a protrusion that extends over a portion of the inertial latch when the inertia latch is mounted on the straight pin to thereby prevent the inertial latch from being dislodged from the straight pin.

Other features and benefits that characterize embodiments of the present invention will be apparent upon reading the following detailed description and review of the associated drawings.

BRIEF DESCRIPTION OF THE DRAWINGS

FIG. 2 is an exploded view of a voice coil motor of a disc drive.

FIG. 4-1 is a cross-section of a portion of a voice coil motor showing an inertial latch mounted on a bottom pole assembly.

FIG. 4-2 is a cross-sectional view of a bottom pole assembly, inertial latch and top pole assembly joined together.

FIGS. 5-1 and 5-2 are diagrammatic views illustrating the installation of an inertial latch on the bottom pole assembly of FIG. 3 in accordance with an embodiment of the present invention.

DETAILED DESCRIPTION OF ILLUSTRATIVE EMBODIMENTS

In the embodiments described below, a disc drive actuator inertial latch is mounted on a voice coil motor (VCM) pole assembly. The pole assembly includes a straight pin serving as an axle for the inertial latch. The pole assembly also includes an protrusion that extends over a portion of the inertial latch when the inertial latch is mounted on the straight pin to thereby prevent the inertial latch from being dislodged from the straight pin.

Figure 1:
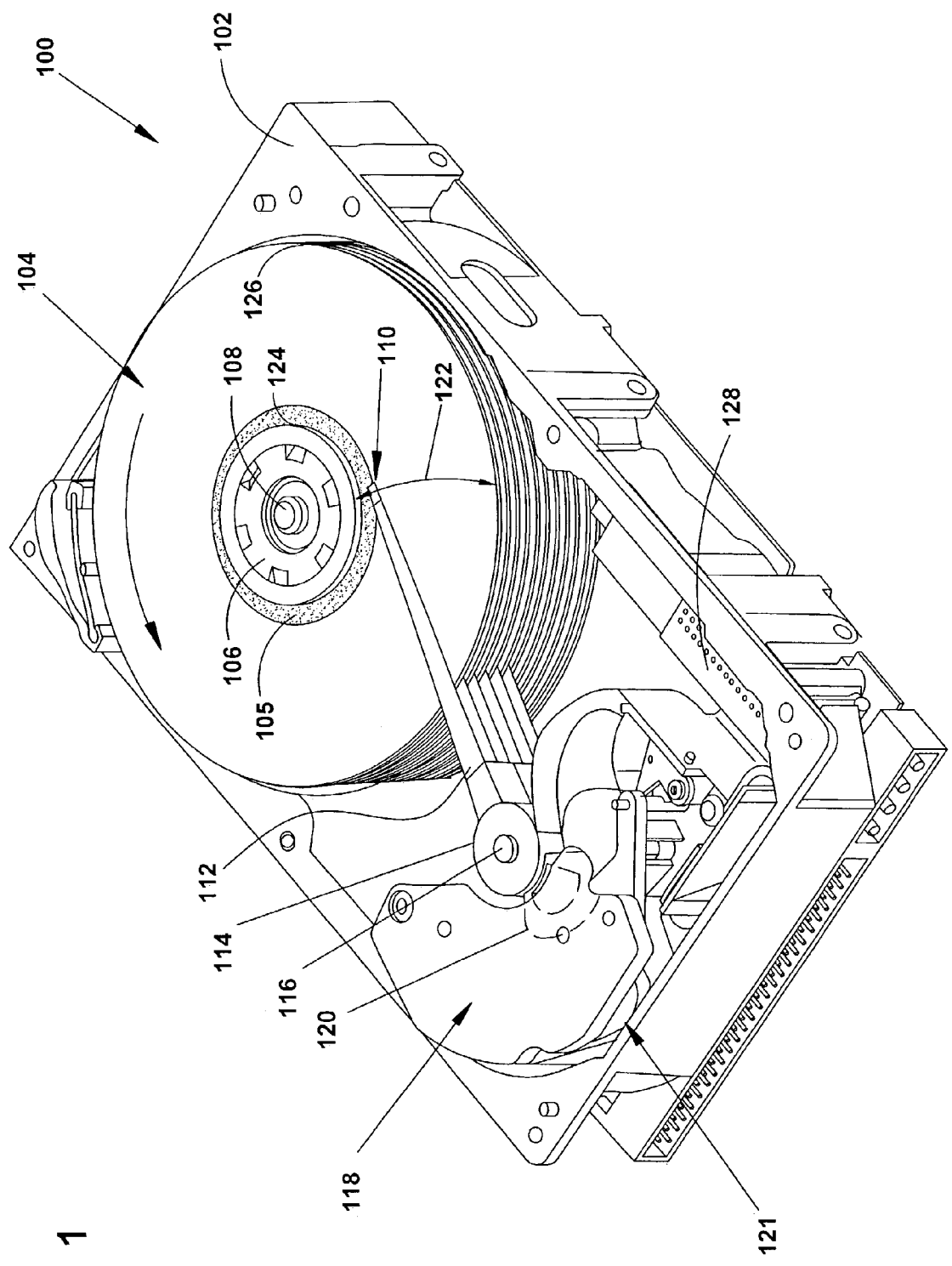
FIG. 1 is a perspective view of a disc drive.

Referring now to FIG. 1, a perspective view of a magnetic or optical disc drive 100 in which the present invention is useful is shown. Disc drive 100 includes a housing with a base 102 and a top cover (not shown). Disc drive 100 further includes a disc pack 104, which is mounted on a spindle motor (not shown), by a disc clamp 106. Disc pack 104 includes a plurality of individual discs, which are mounted for co-rotation about central axis 108. Each disc surface has an associated transducer head 110, which is mounted on a head assembly 112 mounted to disc drive 100 for communication with the disc surfaces. Transducer head 110 can include a read head, a write head, or both a read and a write head. Each disc surface further includes a park surface 105, which is textured, for parking transducer head 110 when the disc drive 100 is de-energized. Head assembly 112 is mounted to a bearing 114 which is actuated to rotate or pivot on an axle shaft 116, or other pivot point, which is mounted to the base 102. A voice coil motor (VCM), shown generally at 118 actuates a voice coil 120 that is attached to the bearing 114. VCM 118 rotates bearing 114 with its attached head assembly 112 about the axle shaft 116 to position transducer head 110 over a desired data track along an arcuate path 122 between a disc inner diameter 124 and a disc outer diameter 126. VCM 118 operates under control of internal circuitry 128. When disc drive 100 is de-energized, the VCM 118 moves the heads to the park surface 105, and latches (a primary latch and a secondary or inertial latch), shown generally at 121, latch the voice coil motor in a position that parks the transducer head 110 on the park surface 105.

Figures 1, 4:
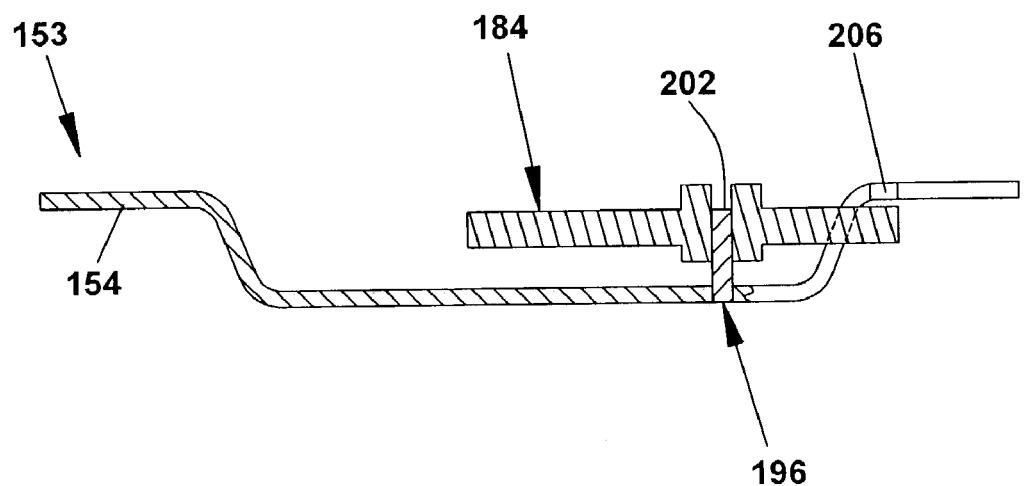
Figures 2, 4:
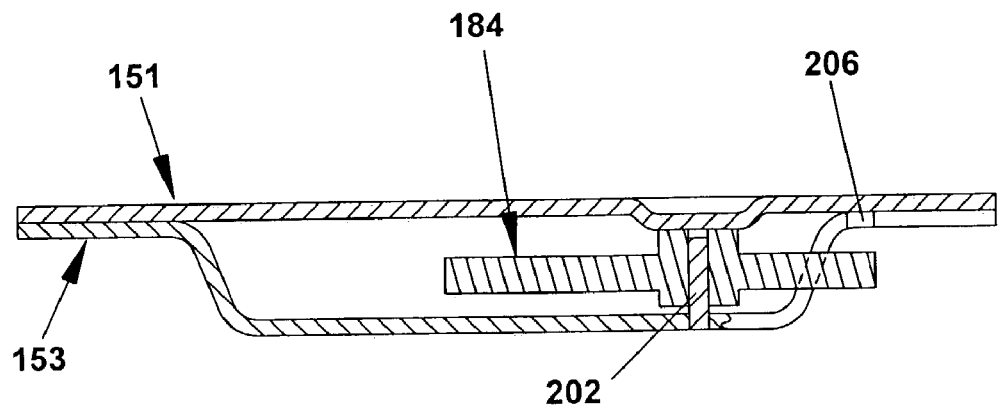

Referring now to FIG. 2-1, an exploded view of a voice coil motor 118 is shown. VCM 118 includes a top pole assembly 151 and a bottom pole assembly 153. Top pole assembly 151 includes an upper plate 152 and a permanent magnet 160 that is joined to upper plate 152. Bottom pole assembly 153 includes a lower plate 154 and a permanent magnet 162 that is joined to lower plate 154. An air gap 164 is formed between permanent magnets 160 (hidden by upper plate 152) and 162. A voice coil 166 is rotationally mounted to an axle 168 and also mounted to transducer heads (not shown in FIG. 2-1) attached to the end of arm 170 (which is part of head assembly 112). An electric current 172 is passed through voice coil 166. Current 172 interacts with magnetic field 174 in the air gap 164 to rotate the voice coil as shown by arrow 176.

When the transducer heads are to be parked, a current is passed through voice coil 166 to rotate the voice coil such that tab 180 is engaged by primary latch 182. Primary latch 182 includes a magnet and tab 180 includes a magnetic material. Thus, tab 180 remains engaged by primary latch 182 even when the energization current is removed from voice coil 166. Secondary or inertial latch 184 includes a hub 186 and a latch arm 188. A magnetic detent 190 near the distal end 189 of latch arm 188 interacts with a fringing magnetic field near the edge of the air gap 164 between permanent magnets 160, 162. The interaction of magnetic detent 190 with the fringing field exerts a detent force on magnetic detent 190 that, in turn, generates a detent torque on the latch arm 188, which holds inertial latch 184 in an unlatched position in the absence of high level shocks applied to the disc drive. The magnetic detent 190 is a sphere of magnetic material with a diameter that has been reduced so that it will fit in the narrow air gap 164. When a high level shock is applied to the disc drive, the force on inertial latch 184 is sufficient to overcome the detent force and therefore inertial latch 184 rotates in response to the applied force such that hook 191 of inertial latch 184 engages tab 180. When the shock level reduces, the detent force exerted on inertial latch 184 causes hook 191 to release tab 180. VCM 118 also includes a first post 193, which is formed of any suitable metal or plastic, that limits the rotation of voice coil 166 such that transducer heads 110 do not move beyond outer disc diameter 126 (FIG. 1). A second post (not shown) may be included between the distal end 189 of latch arm 188 and permanent magnet 162 to limit the movement of latch arm 188.

Before the disc drive is assembled, the inertial latch is mounted to one of the top and bottom pole assemblies of the VCM, and the combined inertial latch and single (top/bottom) pole are transported from a supplier to the disc drive manufacturing plant and/or along an assembly line during manufacture of the disc drive before the top and bottom poles of the VCM are joined together. Thus, the inertial latch needs to be constrained on the single (top/bottom) pole during transportation. Conventionally, bottom pole assembly 153 has included a pivot pin with a cap that constrains inertial latch 184 on bottom pole 153. As mentioned above, although the cap of the pivot pin constrained inertial latch 184 on bottom pole 153 of VCM 118, there are several disadvantages associated with this technique for constraining inertial latch 184. One disadvantage is that pivot pins with caps are costly. Further, inertial latch 184 has to be first mounted on the pin and then the pin with inertial latch 184 has to be press-fit into a groove of lower plate 154 of VCM 118. This is a multi-step operation which is relatively time consuming. To avoid these disadvantages associated with utilizing a pin with a cap for constraining the inertial latch, bottom pole assembly 153, discussed below in greater detail in connection with FIG. 3, is employed.

Figure 3:
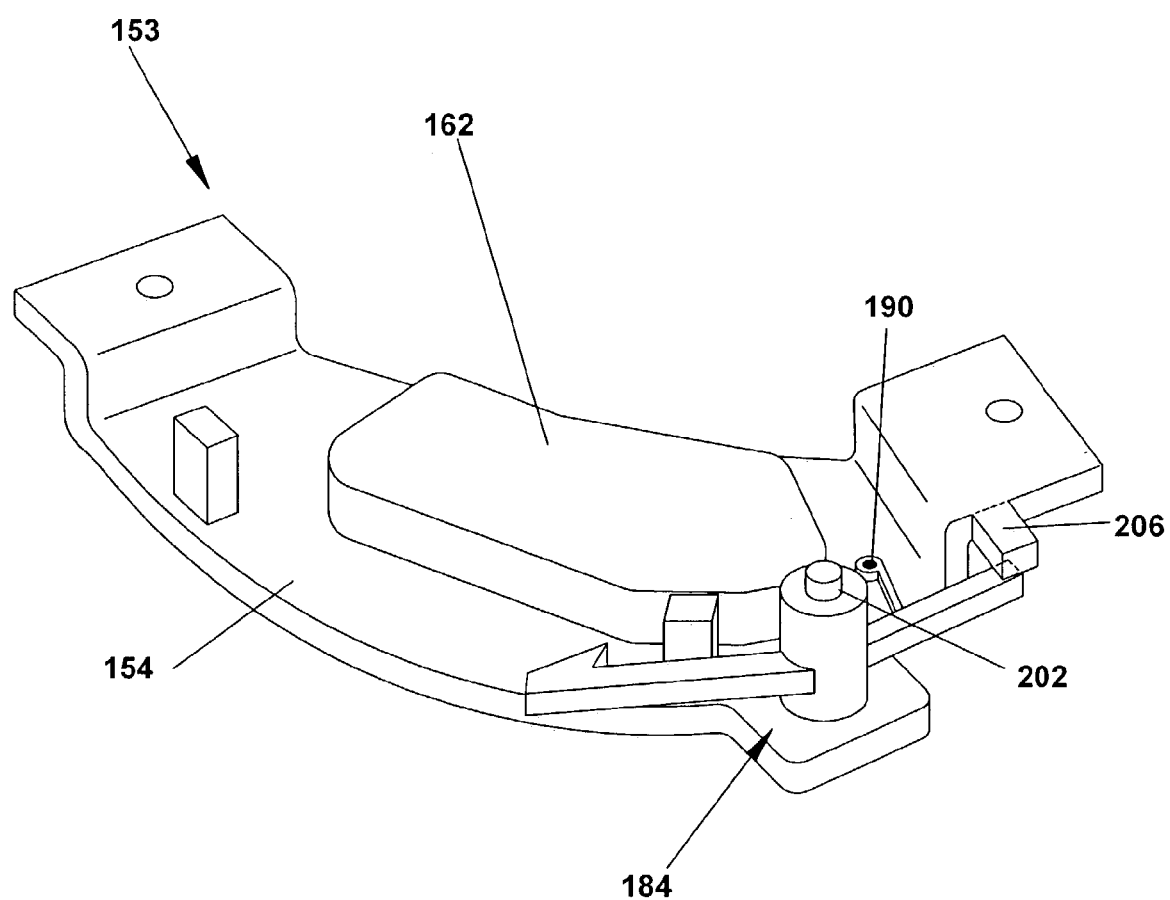
FIG. 3 is a diagrammatic view of a voice coil motor bottom pole assembly in accordance with an embodiment of the present invention.

Referring now to FIG. 3, a diagrammatic view of a bottom pole assembly 153 of the present invention on which inertial latch 184 is mounted is shown. As can be seen in FIG. 3, bottom pole assembly 153 includes a straight pin 202, which serves as an axle for inertial latch 184. Further, to prevent inertial latch 184 from being dislodged from straight pin 202, bottom pole assembly 153 further includes a protrusion 206, which constrains inertial latch 184 on bottom pole 153 during transportation before bottom pole 153 and top pole 151 (FIG. 2) are joined together. As can be seen in FIG. 3, protrusion 206 extends from bottom plate 154 of bottom pole assembly 153. In some embodiments, protrusion 206 is formed integral with bottom plate 154 during manufacture of bottom plate 154, by a suitable process such as stamping, extrusion, or casting, though of course other processes may be used. In other embodiments, protrusion 206 is formed separate from bottom plate 154 and can be subsequently coupled to bottom plate 154. Protrusion 206 may be formed of any suitable material (metal, plastic, etc.). In some embodiments of the present invention, bottom plate 154 and protrusion 206 may each be formed of a different material. In other embodiments of the present invention, bottom plate 154 and protrusion 206 are formed of the same material. Details regarding installation of inertial latch 184 on bottom pole assembly 153 are provided further below in connection with FIGS. 5-1 and 5-2.

FIG. 4-1 is a cross-section of inertial latch 184 and bottom pole assembly 153 before top pole assembly 151 (FIG. 2-1) is joined to bottom pole assembly 153. FIG. 4-2 is a similar cross-section after top pole assembly 151 is joined to bottom pole assembly 153. Without top pole assembly 151 joined to bottom pole assembly 153, a portion of inertial latch 184 may extend above straight pin 202 and be in contact with protrusion 206 as shown in FIG. 4-1. However, as shown in FIG. 4-2, when top pole assembly 151 is installed on bottom pole assembly 153, inertial latch 184 is held below, and not in contact with, protrusion 206. Preventing inertial latch 184 from coming in contact with protrusion 206 after installation in disc drive 100 is important because any friction between inertial latch 184 and protrusion 206 would impede proper operation of inertial latch 184.

Referring now to FIGS. 5-1 and 5-2, the installation of inertial latch 184 on bottom pole assembly 153 of the present invention is shown. In the illustrated embodiment, prior to mounting inertial latch 184 on bottom pole assembly 153, straight pin 202 is press fit into a groove (not shown in FIGS. 5-1 and 5-2) in bottom plate 204. It should of course be understood that pin 202 may be installed in any number of suitable ways without departing from the spirit of the invention; for example, the pin may be integrally formed with the pole assembly 153, or may be held in place by adhesives. Inertial latch 182 is then fit on straight pin 202 from above, with a certain amount of clearance (designated by reference numeral 210) between inertial latch 184 and protrusion 206. This can be carried out using any tool that is capable of grasping inertial latch 184 and fitting it on straight pin 202, or even carried out manually. Next, inertial latch 184 is released. As can be seen in FIG. 5-2, when inertial latch 184 is released, it automatically rotates a certain angle θ due to magnetic force (F) exerted by magnet 162 on detent 188 of inertial latch 184. Thus, a portion of inertial latch 184 is held under protrusion 206 to thereby prevent inertial latch 184 from being dislodged from pin 202. This installation technique is relatively simple compared to previously-known installation procedures.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the preferred embodiment described herein is directed to a voice coil motor pole assembly for supporting an inertial latch in a disc drive data storage system, it will be appreciated by those skilled in the art that the teachings of the present invention can be applied to other systems employing such an inertial latch, without departing from the scope and spirit of the present invention. Further, although the embodiments described above are directed to utilizing a straight pin and including an protrusion in the bottom pole assembly, these components can instead be included in the top pole assembly and the inertial latch may be installed on the top pole assembly. In such embodiments, pole 151 shown in the figures can be considered a bottom pole, while pole 153 can be considered to be a top pole, for example. However, other features shown on these poles 151 and 153 can be implemented on the opposite pole as well, if desired, in these alternate embodiments.

What is claimed is:

1. A voice coil motor pole assembly for supporting a rotating latch, comprising:
   a plate;
   a pin extending from the plate, the pin being configured to serve as an axle for the latch; and
   a protrusion extending from the plate, the protrusion being configured to extend over a portion of the latch when the latch is mounted on the pin to thereby prevent the latch from being dislodged from the pin.

2. The voice coil motor pole assembly of claim 1, in which the plate further comprises:
   a groove, an end of the pin being held within in the groove.

3. The voice coil motor pole assembly of claim 1, wherein the protrusion is integrally formed with the plate.

4. The voice coil motor pole assembly of claim 1 further comprising at least one magnet joined to the plate.

5. The voice coil motor pole assembly of claim 4 wherein the at least one magnet is configured to exert a force on the latch when the latch is mounted to the pin to thereby hold the latch adjacent the protrusion.

6. A voice coil motor including the voice coil motor pole assembly of claim 1.

7. The voice coil motor of claim 6 wherein the voice coil motor pole assembly is a voice coil motor top pole assembly.

8. The voice coil motor of claim 6 wherein the voice coil motor pole assembly is a voice coil motor bottom pole assembly.

9. The voice coil motor of claim 8 further comprising a voice coil motor top pole assembly which, when attached to the voice coil motor bottom pole assembly, holds the latch below, and not in contact with, the protrusion.

10. A disc drive comprising the voice coil motor pole assembly of claim 1.

11. A method of supporting a rotating latch of a disc drive before installation of the latch in the disc drive, the method comprising:
   (a) providing a voice coil motor pole assembly comprising:
      a pin serving as an axle for the latch; and
      a protrusion that extends over a portion of the latch when the latch is mounted on the pin to thereby prevent the latch from being dislodged from the pin; and
   (b) mounting the latch on the pin such that the latch is free to rotate about the pin.

12. The method of claim 11 wherein the voice coil motor pole assembly further comprising a plate having a groove within which an end of the pin is held.

13. The method of claim 12 wherein the protrusion extends from the plate.

14. The method of claim 12 wherein the voice coil motor pole assembly further comprising at least one magnet joined to the plate.

15. The method of claim 14 wherein the at least one magnet exerts a force on the latch to thereby hold the latch adjacent the protrusion.

16. A voice coil motor pole assembly for supporting a rotating latch, comprising:
   a pin serving as an axle for the latch; and
   means for preventing the latch from being dislodged from the pin.

17. The voice coil motor pole assembly of claim 16 wherein the means for preventing the latch from being dislodged from the pin comprises a protrusion that is configured to extend over a portion of the latch when the latch is mounted on the pin.

18. The voice coil motor pole assembly of claim 17 further comprising a plate having a groove within which an end of the pin is held.

19. The voice coil motor pole assembly of claim 18 wherein the protrusion extends from the plate.

20. The voice coil motor pole assembly of claim 18 further comprising at least one magnet joined to the plate.

* * * * *